US008055065B2

(12) United States Patent
Allen

(10) Patent No.: US 8,055,065 B2
(45) Date of Patent: Nov. 8, 2011

(54) VECTORISATION OF COLOUR GRADIENTS

(75) Inventor: Matthew James Allen, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 872 days.

(21) Appl. No.: 11/996,130

(22) PCT Filed: Sep. 22, 2006

(86) PCT No.: PCT/AU2006/001393
§ 371 (c)(1),
(2), (4) Date: Apr. 18, 2008

(87) PCT Pub. No.: WO2007/033429
PCT Pub. Date: Mar. 29, 2007

(65) Prior Publication Data
US 2008/0212873 A1 Sep. 4, 2008

(30) Foreign Application Priority Data

Sep. 23, 2005 (AU) ................. 2005211665

(51) Int. Cl.
G06K 9/00 (2006.01)
(52) U.S. Cl. ...................................... 382/162
(58) Field of Classification Search .................. 382/180, 382/181, 197, 266; 345/421, 426, 441, 442, 345/581, 591, 600, 606
See application file for complete search history.

(56) References Cited

U.S. PATENT DOCUMENTS

| 6,121,976 | A | 9/2000 | Lu .................................. 345/431 |
| 6,201,550 | B1 | 3/2001 | Sakamoto | |
| 6,912,309 | B2 | 6/2005 | Lee ............................... 382/197 |
| 7,038,697 | B2 | 5/2006 | Gangnet et al. ............... 345/606 |
| 7,427,994 | B2* | 9/2008 | Gangnet et al. ............... 345/606 |
| 2004/0240736 | A1 | 12/2004 | Karidi et al. .................. 382/176 |
| 2005/0002566 | A1 | 1/2005 | Di Federico et al. ......... 382/176 |

FOREIGN PATENT DOCUMENTS

| JP | 9-190538 | 7/1997 |
| JP | 11-25282 | 1/1999 |
| JP | 11-45341 | 2/1999 |

OTHER PUBLICATIONS

Office Action dated Oct. 12, 2010 in JP 2008-530279.
Notice of Acceptance dated Nov. 30, 2010 in Australian Patent Application No. 2006294425.
Y. Okada, et al., "Description of Gradation Construction using Color Contour Line", The Journal of the Institute of Image Electronics Engineers of Japan, Oct. 25, 1993, vol. 22, No. 5, pp. 530 to 537.
Office Action dated Oct. 12, 2010 in JP 2008-530279. (Partial translation of Reason B).
International Preliminary Report on Patentability dated Mar. 26, 2008 in International Application No. PCT/AU2006/001393.

* cited by examiner

Primary Examiner — Jose Couso
(74) Attorney, Agent, or Firm — Fitzpatrick, Cella, Harper & Scinto

(57) ABSTRACT

A method is described of generating a vector description of a color gradient in an image. The image comprises an array of pixels, each pixel having one or more associated color values. The image has at least one gradient area in which at least one of the color values varies between neighboring pixels. In each gradient area, a path is generated (step 210) comprising pixels having substantially the same color. Linear paths (403) and circular paths (501) are described. One or more control points are determined (step 220, 230) defining a line substantially perpendicular to the path. Representative color values are calculated at points along the line and a piecewise-linear color function is generated from the representative color values (step 240). The one or more control points and the piecewise-linear color function form a vector description of the color gradient in the gradient area.

19 Claims, 7 Drawing Sheets

VECTORISATION OF COLOUR GRADIENTS

FIELD OF INVENTION

The current invention relates to computer graphics and in particular to generating a vector description of colour gradients in images.

BACKGROUND

It is often desirable to convert image data into a higher-level form. Such conversion may allow the image data to be stored more efficiently. In addition, the resultant higher-level description may be required for further processing of the image data.

Prior art methods for converting an image from a simple raster bitmap into a higher level form like a vector graphics description involve either leaving the colour data in bitmap form or converting small areas of similar colour to flat filled objects.

In the first case where a bitmap is used for the colour data of the converted image, lots of memory is used in storing the bitmap. In the second case in which small areas are converted to flat filled objects, the main problem is that rendering all the areas of flat colour is computationally expensive. An example of this is shown in FIG. 3, where shape 352 having a gradient, or blend, fill has been converted to a format in which areas of similar colour are replaced by objects with a flat colour fill. The rings of colour labelled 350 are distinct objects with no relationship in the output. Each of the rings 350 has a flat colour.

In both of the described cases, the resultant colour data may be difficult to edit using simple controls (for example, changing the start and/or end points for a linear gradient). In addition, the colour data consumes a non-trivial amount of memory.

SUMMARY OF THE INVENTION

It is an object of the present invention to substantially overcome, or at least ameliorate, one or more disadvantages of existing arrangements.

According to one aspect of the present invention there is provided a method of generating a vector description of a colour gradient in an image, said method comprising the steps of:

receiving the image comprising an array of pixels, each pixel having one or more associated colour values, the image having at least one gradient area in which at least one of the colour values varies between neighbouring pixels;

generating, in each gradient area, a path comprising pixels having substantially the same colour;

determining one or more control points defining a line substantially perpendicular to the path;

calculating representative colour values at points along the line; and generating a piecewise-linear colour function from the representative colour values, wherein the one or more control points and the piecewise-linear colour function form said vector description of the colour gradient in the gradient area.

According to another aspect of the present invention there is provided an apparatus for generating a vector description of a colour gradient in an image, said apparatus comprising:

means for receiving the image comprising an array of pixels, each pixel having one or more associated colour values, the image having at least one gradient area in which at least one of the colour values varies between neighbouring pixels;

means for generating, in each gradient area, a path comprising pixels having substantially the same colour;

means for determining one or more control points defining a line substantially perpendicular to the path;

means for calculating representative colour values at points along the line; and means for generating a piecewise-linear colour function from the representative colour values, wherein the one or more control points and the piecewise-linear colour function form said vector description of the colour gradient in the gradient area.

According to still another aspect of the present invention there is provided a computer program product comprising machine-readable program code recorded on a machine-readable recording medium, for controlling the operation of a data processing machine on which the program code executes to perform a method of generating a vector description of a colour gradient in an image, said method comprising the steps of:

receiving the image comprising an array of pixels, each pixel having one or more associated colour values, the image having at least one gradient area in which at least one of the colour values varies between neighbouring pixels;

generating, in each gradient area, a path comprising pixels having substantially the same colour;

determining one or more control points defining a line substantially perpendicular to the path;

calculating representative colour values at points along the line; and generating a piecewise-linear colour function from the representative colour values, wherein the one or more control points and the piecewise-linear colour function form said vector description of the colour gradient in the gradient area.

According to still another aspect of the present invention there is provided a computer program comprising machine-readable program code for controlling the operation of a data processing apparatus on which the program code executes to perform a method of generating a vector description of a colour gradient in an image, said computer program comprising:

code for receiving the image comprising an array of pixels, each pixel having one or more associated colour values, the image having at least one gradient area in which at least one of the colour values varies between neighbouring pixels;

code for generating, in each gradient area, a path comprising pixels having substantially the same colour;

code for determining one or more control points defining a line substantially perpendicular to the path;

code for calculating representative colour values at points along the line; and code for generating a piecewise-linear colour function from the representative colour values, wherein the one or more control points and the piecewise-linear colour function form said vector description of the colour gradient in the gradient area.

BRIEF DESCRIPTION OF THE DRAWINGS

One or more embodiments of the present invention will now be described with reference to the following drawings, in which.

DETAILED DESCRIPTION INCLUDING BEST MODE

There are many circumstances in which it may be desired to convert a raster bitmap into a higher-level description. One such application is in processing scanned images, as described below with reference to FIG. 6. However, the described methods are not limited to this particular application, but may be used more generally where there is a need to identify gradient information in an input image and to convert the gradient information to a vector description.

Such a need may arise, for example, when processing the output of a renderer. The output may contain too much detail to provide an efficient description for further processing. Generating a vector description may help to accelerate any further processing or to reduce the size of the output description.

Operating Environment

Figure 6:
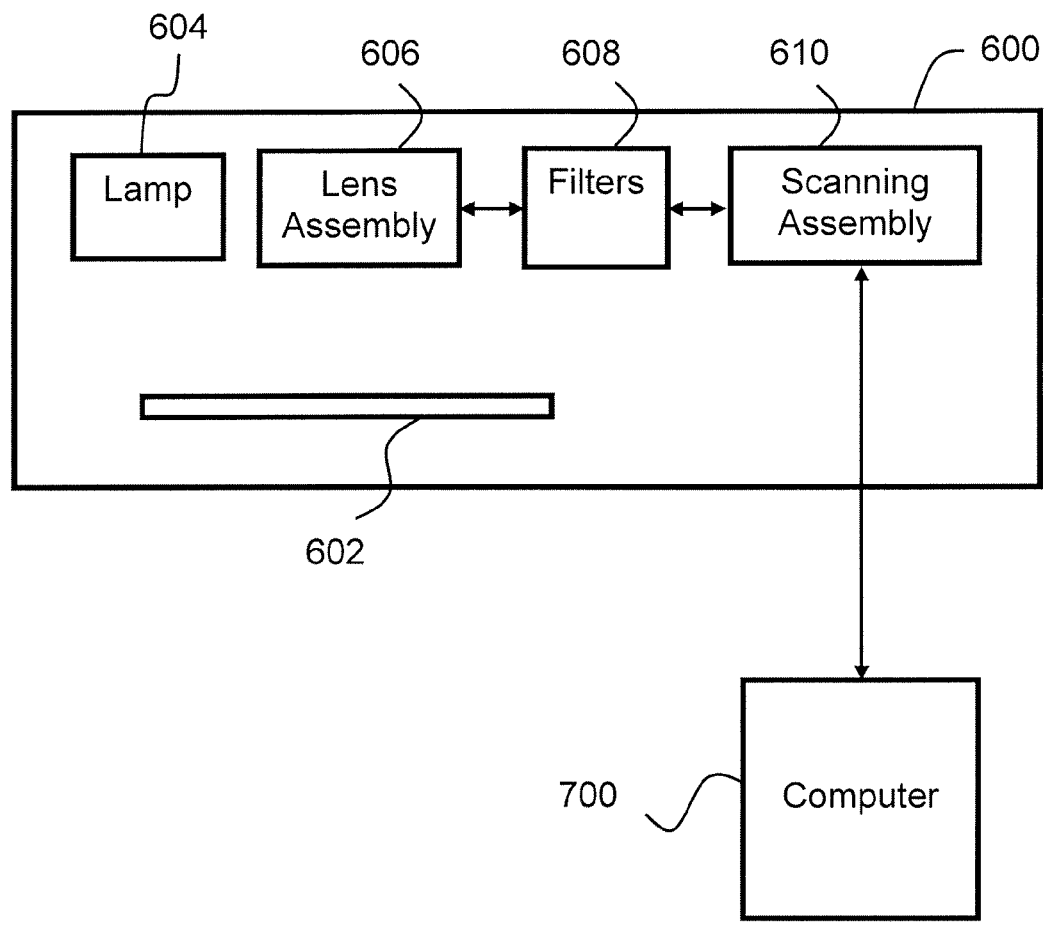
FIG. 6 is a schematic block diagram of a system in which the method of FIG. 1 may be applied.

FIG. 6 illustrates a system in which the methods described herein may be applied. Scanner 600 is used to convert a document or image to an electronic bitmap, which may be sent to computer 700 for further processing. The bitmap may be converted into a searchable form, for example by applying Optical Character Recognition (OCR). Converting the bitmap to a vector graphics format may provide a more efficient description for storage or further processing.

The scanner 600 includes a plate 602 for supporting and positioning an input document or image. The input is illuminated by the lamp 604, which may be a xenon lamp or a cold cathode fluorescent lamp, for example. A lens assembly 606 conveys images of all or part of the input to a system of optical filters 608. The scanner may have three sets of filters to transmit red, green and blue light respectively. The scanning assembly 610, which may include charge-coupled device (CCD) arrays, scans the output of filters 608. The CCD arrays include light-sensitive diodes that convert photons into electrons, thus forming an electronic description of the image arriving via the lens system 606 and filters 608. In a single-scan arrangement, there is a separate CCD array for each of the red, green and blue components. Alternatively, the input may be scanned repeatedly, with a different filter being placed before a CCD array for each scan to register a different colour component of the image. The image description may be transferred to a computer 700 for storage or processing. Driver software running on the computer 700 controls communication between the computer 700 and the scanner 600. The devices 600, 700 may be linked via a network, which may also communicate with one or more printers for printing copies of the input document.

Description of General-purpose Computer

The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present invention also implicitly discloses a computer program, in that it would be apparent to the person skilled in the art that the individual steps of the methods described herein are to be put into effect by computer code. The computer program is not intended to be limited to any particular programming language and implementation thereof. It will be appreciated that a variety of programming languages and coding thereof may be used to implement the teachings of the disclosure contained herein.

Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

Figure 1:
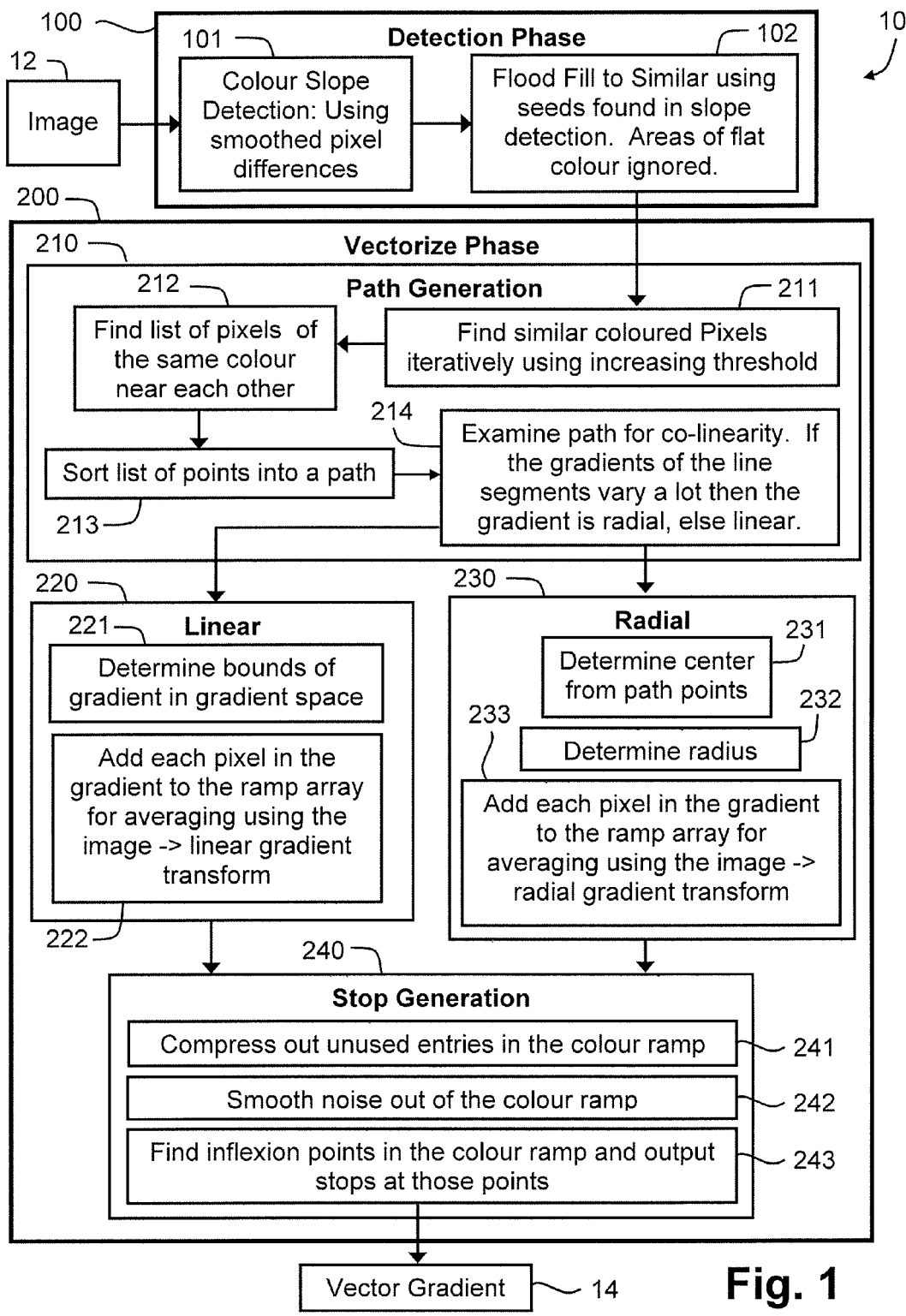
FIG. 1 is a flow chart of a method of generating a vector description of one or more colour gradients in an image.
Figure 7:
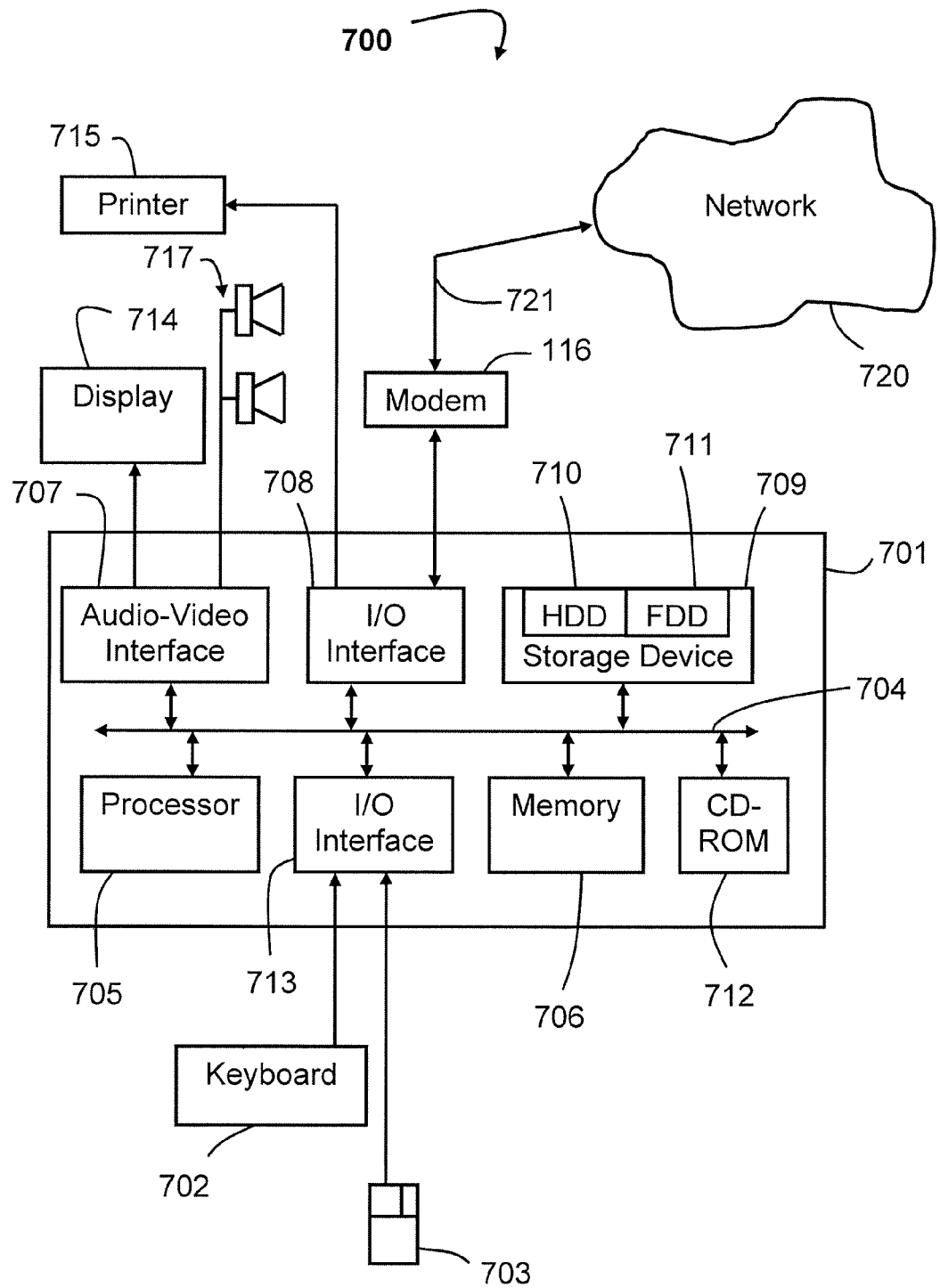
FIG. 7 is a schematic block diagram of a general-purpose computer on which the described methods may be practiced.

The method of converting colour gradients to a vector description is preferably practiced using a general-purpose computer system 700, such as that shown in FIG. 7 wherein the processes of FIG. 1 may be implemented as software, such as an application program executing within the computer system 700. In particular, the method steps are effected by instructions in the software that are carried out by the computer. The instructions may be formed as one or more code modules, each for performing one or more particular tasks. The software may be stored in a computer readable medium, including the storage devices described below. The software is loaded into the computer from the computer readable medium, and then executed by the computer. A computer readable medium having such software or computer program recorded on it is a computer program product. The use of the computer program product in the computer preferably effects an advantageous apparatus for generating a vector description of colour gradients.

The computer system 700 is formed by a computer module 701, input devices such as a keyboard 702 and mouse 703, output devices including a printer 715, a display device 714 and loudspeakers 717. A Modulator-Demodulator (Modem) transceiver device 716 is used by the computer module 701 for communicating to and from a communications network 720, for example connectable via a telephone line 721 or other functional medium. The modem 716 can be used to obtain access to the Internet, and other network systems, such as a Local Area Network (LAN) or a Wide Area Network (WAN), and may be incorporated into the computer module 701 in some implementations.

The computer module 701 typically includes at least one processor unit 705, and a memory unit 706, for example formed from semiconductor random access memory (RAM) and read only memory (ROM). The module 701 also includes an number of input/output (I/O) interfaces including an audio-video interface 707 that couples to the video display 714 and loudspeakers 717, an I/O interface 713 for the keyboard 702 and mouse 703 and optionally a joystick (not illustrated), and an interface 708 for the modem 716 and printer 715. In some implementations, the modem 716 may be incorporated within the computer module 701, for example within the interface 708. A storage device 709 is provided and typically includes a hard disk drive 710 and a floppy disk drive 711. A CD-ROM drive 712 is typically provided as a non-volatile source of data. The components 705 to 713 of the computer module 701, typically communicate via an interconnected bus 704 and in a manner which results in a conventional mode of operation of the computer system 700 known to those in the relevant art.

Typically, the application program is resident on the hard disk drive 710 and read and controlled in its execution by the processor 705. Intermediate storage of the program and any data fetched from the network 720 may be accomplished using the semiconductor memory 706, possibly in concert with the hard disk drive 710. In some instances, the application program may be supplied to the user encoded on a CD-ROM or floppy disk and read via the corresponding drive 712 or 711, or alternatively may be read by the user from the network 720 via the modem device 716. Still further, the software can also be loaded into the computer system 700 from other computer readable media. The term "computer readable medium" as used herein refers to any storage or transmission medium that participates in providing instructions and/or data to the computer system 700 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 701. Examples of transmission media include radio or infrared transmission channels as well as a network connection to another computer or networked device, and the Internet or Intranets including e-mail transmissions and information recorded on Websites and the like.

The method of converting colour gradients in images to a higher-level vector description may alternatively be implemented in dedicated hardware such as one or more integrated circuits. Such dedicated hardware may include graphic processors, digital signal processors, or one or more microprocessors and associated memories.

Converting Colour Gradients to Vector Description

FIG. 1 shows a method 10 of generating a vector description of one or more colour gradients in a source image 12. The image 12 is described as an array of pixels arranged on a plurality of scanlines. Initially this array of pixels describing the source image 12 is received by the processor 705 for processing. Each pixel is described by a set (i.e., one or more) of associated colour values, which may be the triplet (R, G, B), describing a red, blue and green colour value respectively for the pixel. The pixel may also have a fourth associated value indicative of opacity. Other colour spaces, for example, may also be used to describe the image 12. The image 12 could also be a greyscale image, in which each pixel is described by a single scalar luminance value.

Method 10 starts with step 100 (the detection phase) which aims to detect the areas in the source image 12 that contain a smooth colour gradient. The detection phase 100 involves two sub-steps. Firstly, sub-step 101 detects colour slopes, using smoothed pixel differences. In sub-step 101, the image 12 is read a scanline at a time, and an array of integers is constructed that contains the colour differences between each pixel and an adjacent pixel (i.e., a neighbouring pixel) on the same scanline. The colour difference between two neighbouring pixels, each containing a red, green and blue colour component, is calculated using this formula:

$$\text{Diff}=abs(R_1-R_2)+abs(G_1-G_2)+abs(B_1-B_2) \qquad \text{Equation (1)}$$

where $(R_1, G_1, B_1)$ are colour component values of the first pixel and $(R_2, G_2, B_2)$ are colour component values of the second pixel. The difference value returned is stored. After the scanline has been fully read, a smoothing function is applied to the array of colour differences. This is done by averaging a given colour difference value with n neighbouring colour differences (i.e., colour difference values from neighbouring pixels) on each side (where in one arrangement, n is 5) and then storing the average back into the given colour difference's location.

Areas of high difference, such as text, have high colour difference values after averaging and areas of flat colour have no difference. Areas of slowly changing colour, like a gradient, have a low colour difference value. So by applying a band pass filter to the colour difference values, sub-step 101 extracts a set of pixels that are on a colour gradient. Pixels that form areas of flat colour are preferably excluded from the set of possible gradient pixels, by detecting runs of k adjacent pixels with zero smoothed colour difference values, where k is a predetermined parameter (in one arrangement k is 5). Pixels having a smoothed colour difference value above a predetermined threshold are also removed from the set of possible gradient pixels.

When scanning in a horizontal direction across the scanline, sub-step 101 cannot detect a vertical linear gradient, as the colour does not vary across the scanline. To work around this, sub-step 101 also repeats the scanning vertically along each pixel column, adding more pixels to the set of pixels found in the $1^{st}$ horizontal pass. The vertical colour differences are also calculated and smoothed before scanning for candidate gradient pixels. Thus the output of sub-step 101 is a set of pixels in the image 12 that appear to be on a colour gradient.

Not all the pixels in the colour gradient(s) are found this way so sub-step 102 is used to expand the set of gradient pixels to the edges of the gradient area, filling all the gaps left by sub-step 101. Sub-step 102 applies a standard flood fill, or region growing, algorithm starting from each of the pixels output from sub-step 101. The boundary for the flood fill is found by using the difference function (Equation (1)) used in step 101 with a configurable predetermined threshold. If the difference between two neighbouring colour values (i.e. a pixel within the gradient set and a neighbouring pixel) is less than the configurable predetermined threshold, the neighbouring pixel is added to the set of gradient pixels. That is, the flood fill algorithm uses the pixels detected in step 101 as seeds (or seed pixels), which were determined based on the colour difference values. The flood fill algorithm may then be applied to the seed pixels to determine surrounding pixels that satisfy a similarity criterion. This stops the flood fill from continuing to expand the set of gradient pixels when the difference between a pixel in the gradient set and a pixel on the edge of the flood fill is above the configurable predetermined threshold. Thus the output for sub-step 102 is a set of all pixels in the input image that form a colour gradient area. That is, the colour gradient area is a result of the flood fill.

All steps after sub-step 102 only operate on the set of gradient pixels output from sub-step 102; pixels not in that set are no longer considered. There may be multiple distinct areas of colour gradient in the input image, so sub-step 102 also keeps track of contiguous areas of colour gradient using a numbering scheme. One method of storing the sub-set of pixels accumulated by sub-step 102 is using a mask, which consists of a two-dimensional array of bytes having the same dimensions as the source image, each value in the mask storing the classification of the corresponding pixel in the source image. A value of zero (0) means that the source pixel is not part of a colour gradient area. A non-zero value is used to indicate that the corresponding pixel in the source image is in a colour gradient area, and the actual value in the mask can store an index such that contiguous areas of colour gradient have the same mask value. For example, if two colour gradient areas exist in the source image 12, all the mask values for the first gradient area have the value one (1) and all the mask values for pixels in the second gradient area have the value two (2).

After the source image is classified into contiguous areas of colour gradient in the detection phase 100, step 200 (the vectorise phase) of method 10 decides the parameters of the colour gradients and constructs a vector description of those gradients. The detection phase 100 and its sub-steps in some cases may not be required at all depending on the application. Those skilled in the art will recognise that other methods of classifying pixels into contiguous areas of colour gradient may be used in place of the described step 100.

Step 200 (the vectorise phase) is executed on each of the contiguous areas of colour gradient. Step 200 firstly needs to decide whether the gradient in question is a linear gradient or a radial gradient. This is the aim of sub-step 210 (the path generation step), and based on the output from sub-step 210, either sub-step 220 is executed in the case that the gradient is linear, or sub-step 230 is executed in the case that the gradient is radial. After either case 220, 230 sub-step 240 is executed to generate 'colour stops' at points of inflexion.

Figure 2:
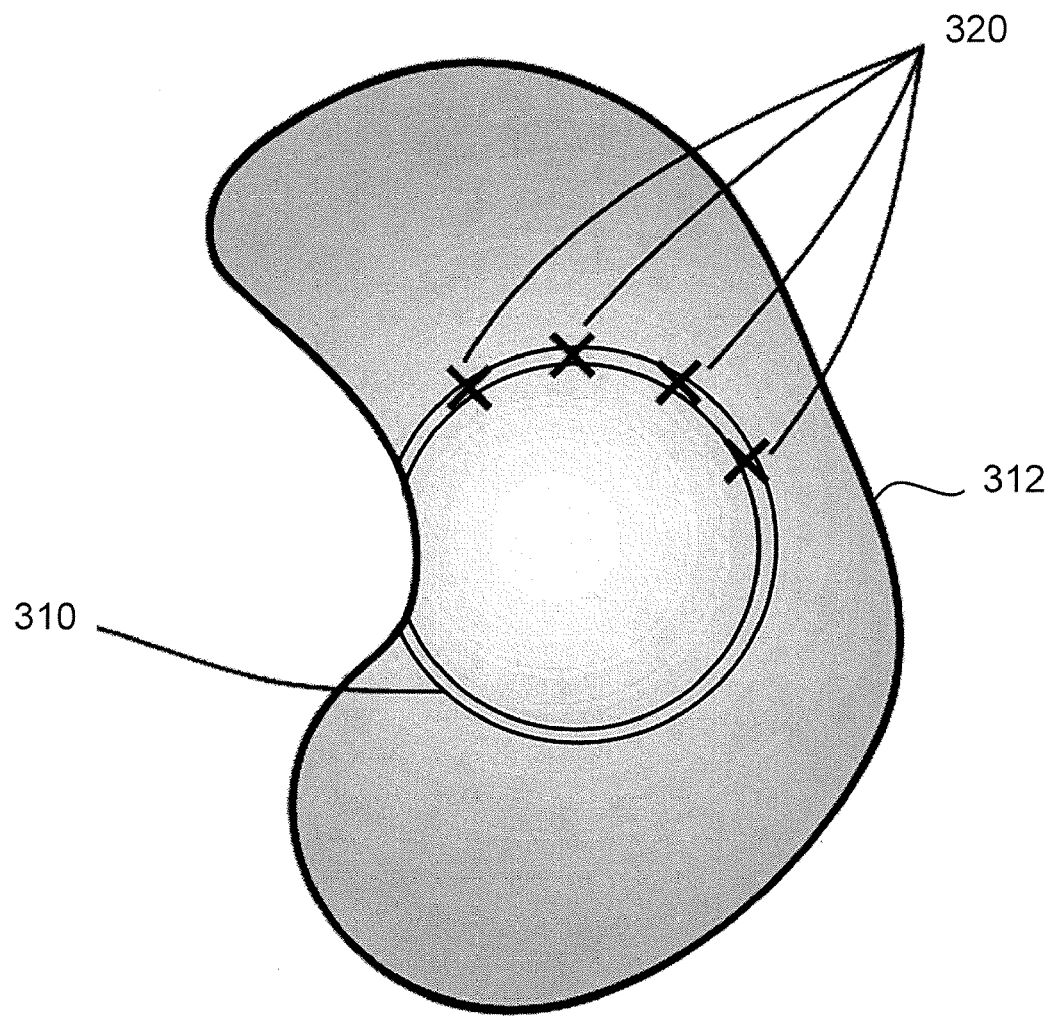
FIG. 2 shows an object used to illustrate the path generation step of the method of FIG. 1.
Figure 3:
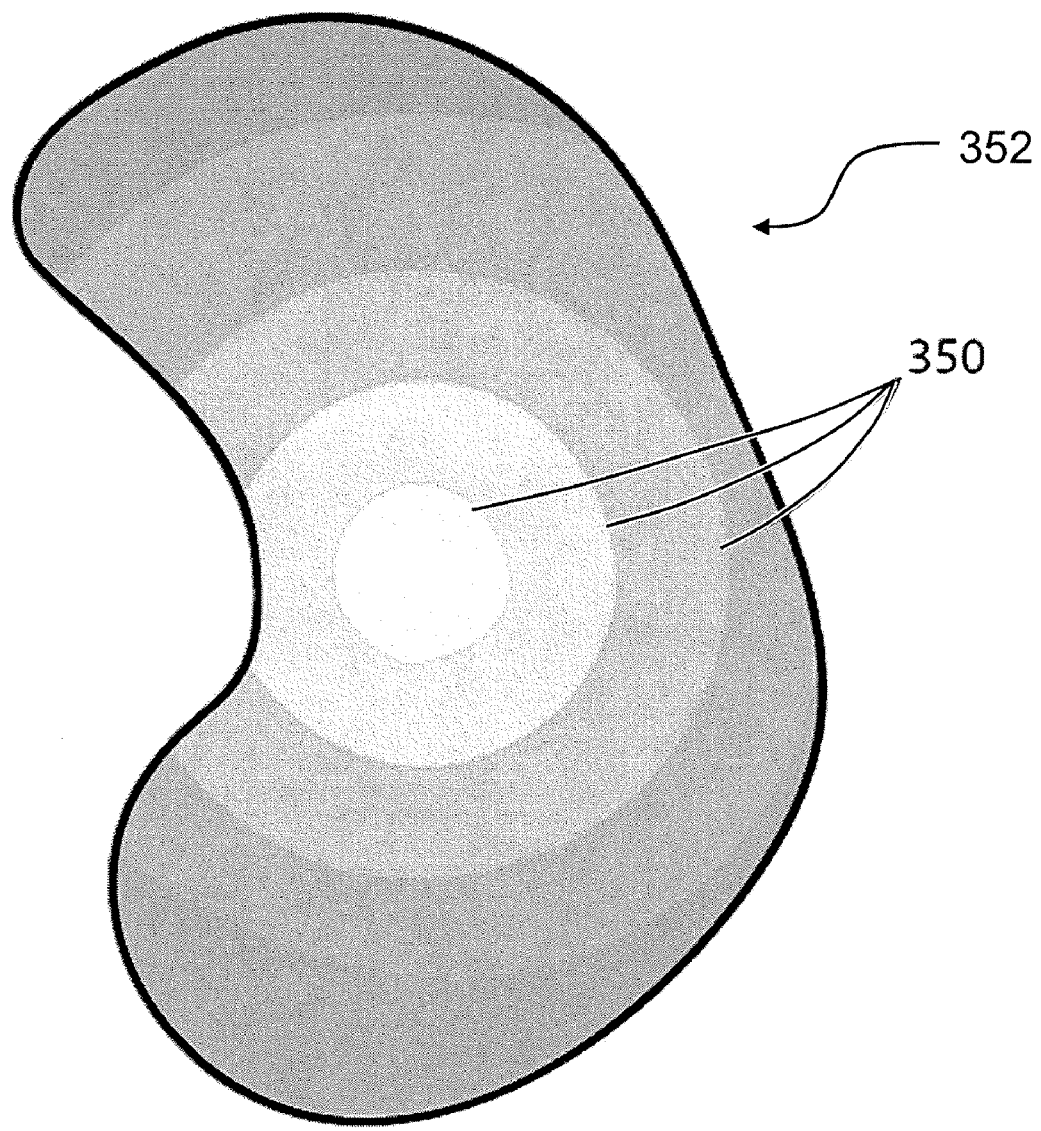
FIG. 3 shows an object used to illustrate a prior art method for approximating a raster bitmap fill.

The path generation sub-step 210 includes four sub-steps, 211, 212, 213 and 214, which generate, in each colour gradient area, a path comprising pixels having substantially the same colour, and determine its linearity. The path generation sub-step 210 begins by executing sub-step 211, which finds a sub-set of pixels in the colour gradient area that are of very similar values according to a similarity measure. This is achieved by picking one of the pixels already in the gradient area and identifying all similarly coloured pixels (i.e., pixels having substantially the same colour) in the gradient area, starting with exact matches and then increasing the predetermined threshold of difference between the starting pixel and the rest of the gradient area until a large enough sub-set of pixels is found. This is illustrated in FIG. 2, which shows an area 312 containing a radial gradient. Reference numeral 310 indicates an annular region of pixels having similar colour. Thus, for example, sub-step 211 may identify the pixels in region 310.

The suitability of the current sub-set is defined by the number of pixels returned by sub-step 212. Sub-step 212 takes the current sub-set found in sub-step 211 and culls the current sub-set down, thereby finding a smaller sub-set such that each pixel in the smaller sub-set is at least some a predetermined minimum distance away from and not more than some predetermined maximum distance away from any other pixel in the smaller sub-set. An example of this is shown in FIG. 2, where the set of pixels labelled 320 is an exemplary sub-set of the pixels in the annular region 310. Sub-step 212 has the effect of outputting a set of pixels, or points, that runs along a colour contour in the gradient. If not enough pixels are in this set at the end of sub-step 212 then sub-step 211's difference threshold is increased and execution resumes with sub-step 211. If there are enough pixels in the sub-set after sub-step 212 has executed then step 200 is allowed to continue to sub-step 213. In one arrangement the minimum number of pixels is five (5), but a minimum of eight (8) pixels may also be used.

Sub-step 213 tales the sub-set of gradient points as an 'unsorted' array of points with (x,y) co-ordinates and sorts the sub-set of gradient points such that the points form a polyline path. This is done by first scanning the array of points and finding end points, or pixels with only one neighbouring point. A neighbouring point is one that is within a certain distance, being defined by:

$$Dist = sqrt((X_1-X_2)^2+(Y_1-Y_2)^2)$$

where $(X_1, Y_1)$ is the first point and $(X_2, Y_2)$ is a possible neighbouring point.

One end point is taken out of the 'unsorted' array and put into a new 'sorted' array. Then the nearest remaining point is moved into the sorted array. After that the remaining points are sorted in sequence by their distance from the last point placed in the sorted array, and the nearest remaining point is moved from the unsorted array to the end of the sorted array.

If there are no end points identified, for example if an entire ring of similar pixels is present, then any point may be selected as a starting point for the sorting step 213.

Once the sorted point list is complete, sub-step 214 looks at the polyline path segments examining the gradient of each line segment. If the line segment gradients are all similar within some configurable tolerance then the polyline path is substantially linear, indicating a linear gradient. Otherwise it is assumed that the gradient is radial.

Figure 4:
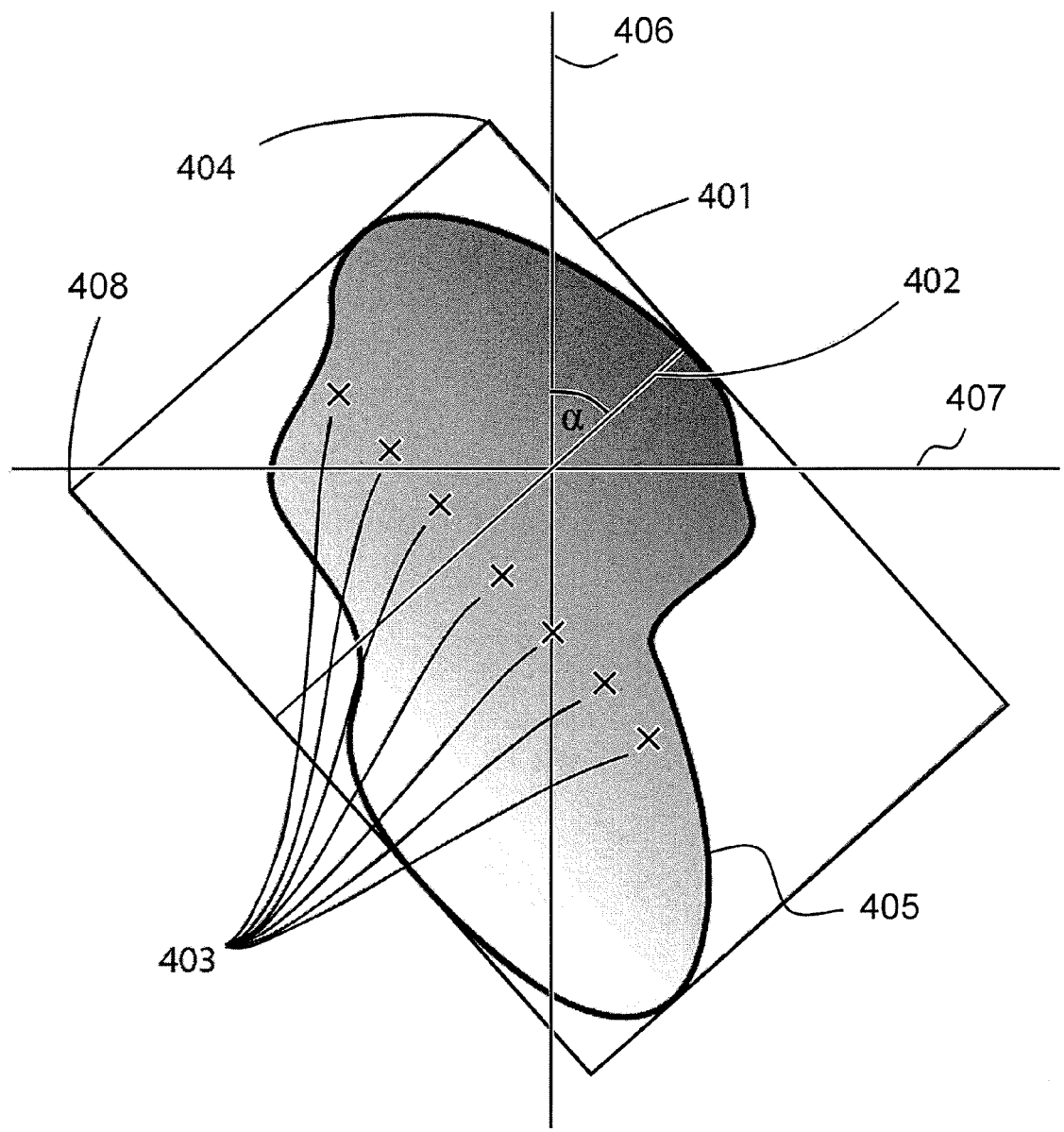
FIG. 4 shows an object used to illustrate finding the parameters of a linear gradient according to the method of FIG. 1.

If sub-step 214 indicated that the gradient is linear then linear sub-step 220 (which includes sub-steps 221 and 222) is executed. Sub-step 220 determines one or more control points defining a line substantially perpendicular to the polyline path generated at step 213, as will be described in detail below. In particular, sub-step 221 determines the geometric parameters, i.e. the bounds of the linear gradient in gradient space. The bounds consist of two end points (or extremities) delimiting a line that is perpendicular to the colour contours of the gradient area, as illustrated with respect to FIG. 4, which shows an area 405 containing a linear colour blend. The position of the area 405 is defined in the image co-ordinate system with x-axis 407 and y-axis 406.

A contour of the linear blend in area 405 is identified in sub-step 211, and the points 403 along the contour are identified in sub-step 212. Line 402 is perpendicular to the colour contour. The contour and line 402 define co-ordinate axes in 'gradient space'. Rectangle 401 is a bounding box of area 405, the sides of the bounding box being parallel to the axes of the gradient space. Point 408 is the beginning point of the linear gradient and point 404 is the ending point of the linear gradient.

Colour gradients specify their colour at discrete points, or 'colour stops' in unit parameter space between zero (0) and one (1) where zero (0) is the parameter at the beginning point 408 and one (1) is the parameter at the ending point 404. Any number of colour stops may be determined and placed in the range zero (0) to one (1) including the end points 0.0 and 1.0. A colour stop comprises the colour and position of a given point in this unit, or normalised, parameter space. Colour varies at a constant rate (linear fashion) between two colour stops. To decide the location of the start and end point 408, 404 of the linear gradient, sub-step 221 needs to scan through all the pixels in the gradient area and transform the position of each pixel into gradient space. Gradient space is defined with one axis (the x-axis) along the colour contour lines and the other axis (the y-axis) along the contour's normal line marked as 402 in FIG. 4. The normal line's angle is calculated by taking the average gradient of the polyline path segments created from the points labelled 403 and calculating the perpendicular angle as arctan(1/average_gradient). The angle α between the gradient normal 402 and the image's y-axis 406 is calculated and used to rotate each gradient pixel's co-ordinates such that the colour contours are horizontal (i.e. the normal 402 is vertical). The maximum and minimum of all the rotated co-ordinates' x and y values are calculated and these form a rectangular bounding box 401 for the gradient area as defined in gradient space. Two points 408, 404 on the left edge of the gradient area's bounding box 401, at the bottom-left corner and the top-left corner respectively, are transformed from gradient space back into the image's co-ordinate space by reversing the rotation applied earlier and these points 408, 404 form the start and end points of the linear gradient, thus completing sub-step 221.

Sub-step 222 constructs a colour ramp array with a configurable number of buckets (in one arrangement 1024 buckets are used), each of which contains three accumulated sums of Red, Green and Blue colour components respectively and a count of pixels. This array of buckets will be referred to as the colour ramp array. The purpose of the colour ramp array is to collect an average colour value (or representative colour value) at corresponding points on a notional vertical axis 402 in the gradient unit parameter space. Each representative colour value is an average taken over colour values of pixels in the gradient area lying on a contour that is parallel to the polyline path and intersects the perpendicular line 402 at the corresponding point.

Sub-step 222 scans through all the pixels in the gradient area and maps the co-ordinates (or position) of each pixel into the gradient unit parameter space by using the gradient space bounding box 401 calculated in sub-step 221. Given the angle between the image space vertical (y) axis 406 and the gradient space axis 402 normal to the colour contours is α and the co-ordinates of the pixel in the gradient area are $(X_1, Y_1)$ then the point's coordinates in gradient space are given by the following image to linear-gradient-space transform:

$$X_G = \cos(\alpha) \cdot X_1 - \sin(\alpha) \cdot Y_1$$

$$Y_G = \sin(\alpha) \cdot X_1 + \cos(\alpha) \cdot Y_1$$

Given the bounding box 401 in gradient space calculated in sub-step 221 is delimited by $(X_{min}, Y_{min}, X_{max}, Y_{max})$ the pixel's position P in the gradient unit parameter space is:

$$P = (Y_G - Y_{min})/(Y_{max} - Y_{min})$$

Where $P >= 0.0$ and $P <= 1.0$

So by calculating P for every pixel in the gradient area, sub-step 222 determines a corresponding bucket for the pixel in the colour ramp array. The sub-step 222 of adding the pixel to the colour ramp array simply adds the Red, Green and Blue colour components to the respective accumulators in the bucket and increments the bucket's pixel count.

Execution then passes to sub-step 240. In the case that sub-step 210 decides that the gradient is a radial gradient, sub-step 230 is executed instead of sub-step 220.

Figure 5:
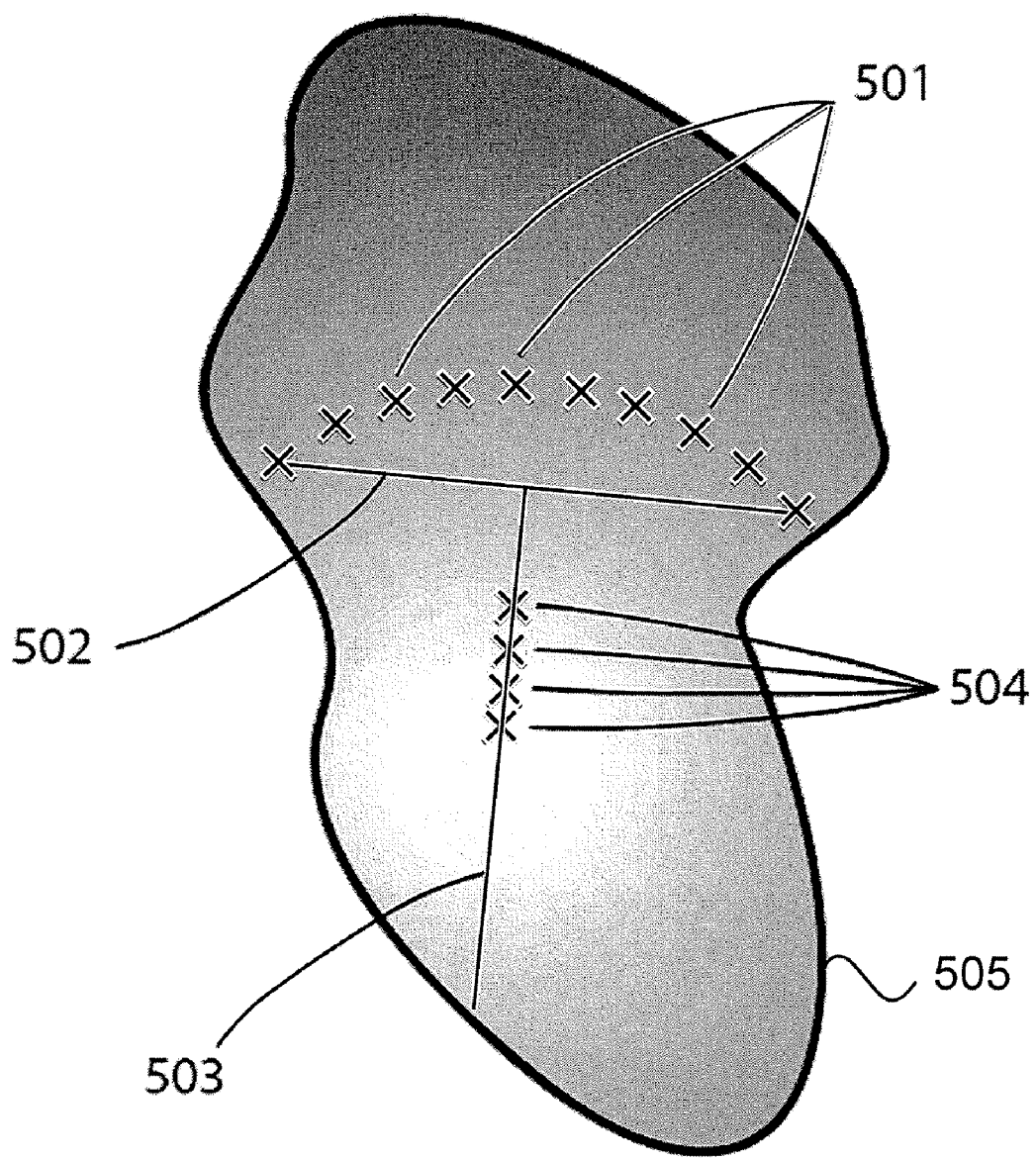
FIG. 5 shows an object used to illustrate finding the parameters of a radial gradient according to the method of FIG. 1.

Sub-step 230's purpose is to decide the geometric parameters of the radial gradient by defining a line substantially perpendicular to the path generated in sub-step 213. These parameters consist of a centre point and a radius. The radial sub-step 230 includes sub-steps 231, 232 and 233, which determine the radial parameters. The determination of the radial parameters is illustrated with reference to FIG. 5, which shows an area 505 containing a radial blend.

Substep 231 calculates the centre of the gradient by starting with the polyline path generated in sub-step 213, which forms a line along a colour contour in the gradient area. In this case the path is an arc of a circle. A subset of the points defining the polyline path (e.g. the points marked 501 in FIG. 5), forming less than half a circle, is identified by comparing gradients of each line segment in the polyline path until the angle has changed through more than 90° and less than 180°. A line 502 is formed between the two end points (or two end pixels) of this subset of points 501 and the mid point of the line 502 is calculated. A new line 503 is formed from the midpoint of line 502 along the normal to line 502 and extending away from the existing points 501 in the polyline subset. This line 503 should come close to intersecting with the centre of the circle defining the radial blend, however the exact co-ordinates of the centre are not yet known. Accordingly, the line 503 is a perpendicular bisector of the line 502 joining the two end points.

By iteratively advancing a point (some examples of this point's movement are marked 504 in FIG. 5) along this line 503 and calculating the distances from point 504 to the polyline path's points until such distances are almost equal (i.e., the polyline path's points are substantially equidistant), sub-step 231 can find a fairly accurate approximation of the centre point of the radial gradient. The centre is a control point of the gradient and the line 503 is substantially perpendicular to the polyline path (i.e., the points marked 501 in FIG. 5). This method is only one such possible method and those skilled in the art will understand that other methods could be used as sub-step 231.

Once the centre is known, sub-step 232 scans through all the pixels in the gradient area, calculating their distance from the centre, and retaining a maximum distance representing the distance from the centre to a furthest pixel of the gradient area. This maximum becomes the radius of the radial gradient.

Given the centre and radius, sub-step 233 proceeds to generate the colour ramp array. This is similar to sub-step 222 for linear gradients in that the purpose of the colour ramp array is to determine a representative colour value at corresponding points in gradient unit parameter space. Each representative colour value is an average of the corresponding colour values of pixels in the gradient area lying on a circular contour centred on the blend centre and passing through the corresponding point. Each pixel in the gradient area is scanned again and the distance between the pixel's co-ordinates and the centre is calculated, and that distance value is transformed into a gradient unit parameter space value between 0 and 1 using the radius. Given a gradient area pixel co-ordinate $(X_1, Y_1)$ the distance to the centre $(X_c, Y_c)$ is:

$$\text{Distance} = \text{sqrt}((X_c - X_1)^2 + (Y_c - Y_1)^2)$$

The distance is mapped into the gradient unit parameter space using the image to radial gradient space transform:

$$P = \text{Distance}/\text{Radius}.$$

This position is mapped into an array of colour buckets, similar to sub-step 222. The colour components of the gradient pixel are added to the bucket's accumulators and the bucket's count is incremented.

Once sub-step 220 or 230 has completed execution passes on to sub-step 240 (the stop generation sub-step), which takes the ramp array of colour buckets from sub-step 222 or 233 and builds a list of colour stops in the gradient unit parameter space (0->1).

Sub-step 241 takes the array of colour buckets and marks any entries that have too small a pixel count (indicating that the corresponding bucket does not contain enough source image pixels to get a good average) to be ignored in all further processing. A configurable lower limit on the pixel count is preferably set to three (3) pixels. Thus, the unused entries are ignored for subsequent processing. At this point each of the colour component accumulators is divided by the number of pixels contributing to the component to get an average (or representative) colour value for that component across all the pixels that contributed to that bucket.

The remaining colour buckets tend to have some noise in the colour components due to stray pixels, scanning artefacts and the effects of anti-aliasing. Sub-step 242 takes the colour ramp array and runs a smoothing function over the representative colour values to remove particularly bad spikes in the data. The smoothing operation can be implemented by any number of suitable algorithms. One such algorithm is to look at each colour bucket component and compare the current bucket to the previous and next buckets. If the value of the current bucket is far enough outside the value of the neighbouring buckets then an average of the neighbouring buckets is used instead.

Sub-step 243 then takes the smoothed colour ramp array and creates a list of colour stops that describes the colour ramp at discrete points in the gradient unit parameter space such that, when rendered, the colour stops, with linear interpolation in between, form a piecewise-linear functional approximation of the full colour gradient. Accordingly, sub-step 243 generates a piecewise-linear colour function from the smoothed representative colour values in the colour ramp array. This sub-step 243 scans the colour ramp array from start to finish and emits colour stops when the gradient of any of the colour components changes significantly, i.e. whenever an inflexion point is identified. That is, a colour stop is added to the piecewise-linear colour function if a difference between the colour component values predicted based on a linear model of colour values at previously considered points and corresponding representative colour values exceeds a predetermined threshold. This calculation is done by moving a "current" pointer through the colour ramp array as well as maintaining a "last" pointer. The last pointer starts at the beginning of the array and is updated to the current position when a colour stop is emitted. The colour ramp can be visualized in a two dimensional plane, where the x-axis is the gradient unit parameter space (where the first colour ramp entry is at x=0 and the last colour ramp entry is at x=1), and the y-axis has the colour component's value for that colour ramp bucket. Each component traces out a rough line across this plane. Sub-step 243 converts the line for each colour component, made of discrete samples, into a vector polyline. The current pointer is advanced from x=0, checking that all the colour component values of each bucket between the current pointer and the last pointer fall on a straight line, or near enough to such a line, within a predetermined threshold. This is done for each colour component individually each time the current pointer is advanced. If any of the colour components between the two (2) pointers are outside the line then a colour stop is emitted and the last pointer is moved to the location of the new colour stop. This sub-step 243 is continued until the end of the colour ramp is reached.

The vectorisation phase 200 ends with the output of vector gradient information 14 (or a vector description), which includes either two end points (i.e., the extremities) for a linear colour gradient or a centre point and a radius for a radial colour gradient (i.e., one or more control points). In addition, the vector gradient information 14 includes a list of colour stops, each having a normalised position coordinate and a colour value. As described above, the colour stops can be used to form a piecewise-linear functional approximation of the full colour gradient.

The benefits of the described arrangements include lower memory usage, faster rendering time and being able to quickly change the gradient parameter of the output vector data.

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

The claims defining the invention are as follows:

1. A method of generating a vector description of a colour gradient in an image, said method comprising the steps of:

receiving the image comprising an array of pixels, each pixel having one or more associated colour values, the image having at least one gradient area in which at least one of the colour values varies between neighbouring pixels;

generating, in each gradient area, a path comprising pixels having substantially the same colour;

determining one or more control points defining a line substantially perpendicular to the path;

calculating representative colour values at points along the line; and generating a piecewise-linear colour function from the representative colour values, wherein the one or more control points and the piecewise-linear colour function form said vector description of the colour gradient in the gradient area, and wherein at least one of the steps is implemented by a computer.

2. A method according to claim 1, wherein the path is substantially linear and the control points are the extremities of the perpendicular line.

3. A method according to claim 1, wherein the path is an arc of a circle and a control point is a centre of the circle.

4. A method according to claim 2 wherein the representative colour value at a point along the line is an average of the corresponding colour values of the pixels in the gradient area lying on a contour that is parallel to the path and intersects the perpendicular line at the point.

5. A method according to claim 3 wherein the representative colour value at a point along the line is an average of the corresponding colour values of the pixels in the gradient area lying on a circular contour centred on the centre and passing through the point.

6. A method according to claim 1 wherein the piecewise-linear colour function is defined by one or more colour stops and wherein said step of generating the colour function considers the points in sequence and, for a currently-considered point, said generating step comprises the substeps of:

predicting one or more colour values at the currently-considered point based on a linear model of colour values at previously-considered points; and adding a colour stop to the colour function if a difference between the one or more predicted colour values and corresponding representative colour values exceeds a predetermined threshold, wherein the colour stop comprises a position and colour of the currently-considered point.

7. A method according to claim 6 further comprising the step of smoothing the representative colour values prior to generating the piecewise-linear function.

8. A method according to claim 1 wherein said step of generating the path comprises the substeps of:
- picking a pixel in the gradient area;
- identifying pixels in the gradient area that have a similar colour to the picked pixel according to a similarity measure dependent on the associated colour values and a predetermined threshold;
- finding a subset of identified pixels such that pixels in the subset are at least a predetermined minimum distance from other pixels in the subset and are less than a predetermined maximum distance from other pixels in the subset; and
- sorting the subset of pixels to form the path.

9. A method according to claim 8 comprising the further step of changing the predetermined threshold and repeating said identifying, finding and sorting substeps until a large enough subset of pixels is found.

10. A method according to claim 1 wherein the path is an arc of a circle and wherein said step of determining control points comprises the substeps of:
- identifying a subset of pixels in the path, the subset bounded by two end pixels and forming less than half the circle;
- calculating a perpendicular bisector of a line joining the two end points; and
- determining a centre point lying on the perpendicular bisector and substantially equidistant from the pixels in the subset, wherein the centre point is a control point forming part of the vector description.

11. A method according to claim 1, further comprising the step of detecting the at least one gradient area.

12. A method according to claim 11, wherein said detecting step comprises the substeps of:
- calculating colour differences between neighbouring pixels in the image;
- identifying seed pixels based on the colour differences; and
- applying a flood fill to the seed pixels, wherein the at least one gradient area is a result of the flood fill.

13. A system for generating a vector description of a colour gradient in an image, said system comprising:
- a memory for storing data and a computer program;
- a processor coupled to said memory for executing said computer program, said computer program comprising instructions for:
- receiving the image comprising an array of pixels, each pixel having one or more associated colour values, the image having at least one gradient area in which at least one of the colour values varies between neighbouring pixels;
- generating, in each gradient area, a path comprising pixels having substantially the same colour;
- determining one or more control points defining a line substantially perpendicular to the path;
- calculating representative colour values at points along the line; and
- generating a piecewise-linear colour function from the representative colour values,
- wherein the one or more control points and the piecewise-linear colour function form said vector description of the colour gradient in the gradient area.

14. A non-transitory computer-readable medium storing a computer program comprising machine-readable program code, for controlling the operation of a data processing machine on which the program code executes to perform a method of generating a vector description of a colour gradient in an image, said method comprising the steps of:
- receiving the image comprising an array of pixels, each pixel having one or more associated colour values, the image having at least one gradient area in which at least one of the colour values varies between neighbouring pixels;
- generating, in each gradient area, a path comprising pixels having substantially the same colour;
- determining one or more control points defining a line substantially perpendicular to the path;
- calculating representative colour values at points along the line; and
- generating a piecewise-linear colour function from the representative colour values,
- wherein the one or more control points and the piecewise-linear colour function form said vector description of the colour gradient in the gradient area.

15. A method comprising the steps of:
- receiving an image including a gradient area in which at least one of colour values each representing a colour of a pixel varies between neighbouring pixels;
- generating, in the gradient area included in the image, a path by identifying an area including a plurality of pixels having colours which are similar such that the difference between the colour values is less than or equal to a threshold;
- finding, from the plurality of pixels included in the identified area, a subset of pixels of which each distance therebetween is equal to or larger than a predetermined minimum distance and smaller than a predetermined maximum distance;
- sorting the pixels included in the subset of pixels;
- in a case where the path is linear, determining one or more control points defining a line perpendicular to the path, and determining representative colour values at points along the line in the gradient area; and
- generating a function for performing linear interpolation between the determined representative colour values, and generating a vector description of a colour gradient for each gradient area by using the control points and the generated function,
- wherein at least one of the steps is implemented by a computer.

16. A method according to claim 15, wherein, in a case where the path is linear, said determining step defines a rectangular bounding box surrounding the gradient area using the line perpendicular to the path and a line parallel to the path, and determines at least representative colour values at the extremities of the rectangular frame as the representative colour values at the points along the line perpendicular to the path.

17. A method according to claim 15, wherein, in a case where the path is an arc of a circle, the determining step determines a center of the circle as a control point, and further determines colour representative values on an outline of the circle of which the center is the control point.

18. A system comprising:
- a memory for storing a computer program; and
- at least one processor for executing said computer program stored in said memory, wherein said at least one processor functions as:
- a receiving unit configured to receive an image including a gradient area in which at least one of colour values each representing a colour of a pixel varies between neighbouring pixels;

a path generating unit configured to generate, in the gradient area included in the image, a path by identifying an area including a plurality of pixels having colours which are similar such that the difference between the colour values is less than or equal to a threshold, configured to find, from the plurality of pixels included in the identified area, a subset of pixels of which each distance therebetween is equal to or larger than a predetermined minimum distance and smaller than a predetermined maximum distance, and configured to sort the pixels included in the subset of pixels;

a determining unit configured to determine, in a case where the path is linear, one or more control points defining a line perpendicular to the path, and to determine representative colour values at points along the line in the gradient area; and a vector description generating unit configured to generate a function for performing linear interpolation between the determined representative colour values, and to generate a vector description of a colour gradient for each gradient area by using the control points and the function.

19. A non-transitory computer-readable medium storing a computer-executable program, wherein the program instructs at least one processor to perform the following steps:

receiving an image including a gradient area in which at least one of colour values each representing a colour of a pixel varies between neighbouring pixels;

generating, in the gradient area included in the image, a path by identifying an area including a plurality of pixels having colours which are similar such that the difference between the colour values is less than or equal to a threshold;

finding, from the plurality of pixels included in the identified area, a subset of pixels of which each distance therebetween is equal to or larger than a predetermined minimum distance and smaller than a predetermined maximum distance;

sorting the pixels included in the subset of pixels;

in a case where the path is linear, determining one or more control points defining a line perpendicular to the path, and determining representative colour values at points along the line in the gradient area; and generating a function for performing linear interpolation between the determined representative colour values, and generating a vector description of a colour gradient for each gradient area by using the control points and the generated function.

* * * * *